(12) United States Patent
Yi et al.

(10) Patent No.: US 7,255,495 B2
(45) Date of Patent: Aug. 14, 2007

(54) AXIS TRANSLATION INSTALLATION MECHANISM FOR OPTOELECTRONIC MODULES

(75) Inventors: Robert H. Yi, San Jose, CA (US); Brenton A. Baugh, Palo Alto, CA (US); James H. Williams, Walnut Creek, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 220 days.

(21) Appl. No.: 10/989,013

(22) Filed: Nov. 15, 2004

(65) Prior Publication Data

US 2006/0104572 A1    May 18, 2006

(51) Int. Cl.
*G02B 6/36* (2006.01)

(52) U.S. Cl. .............................. 385/92; 385/88; 385/94

(58) Field of Classification Search ................ 385/92
See application file for complete search history.

(56) References Cited

U.S. PATENT DOCUMENTS

| 5,515,468 A | 5/1996 | DeAndrea et al. |
| 5,879,173 A | 3/1999 | Poplawski et al. |
| 6,074,228 A | 6/2000 | Berg et al. |
| 6,846,115 B1 * | 1/2005 | Shang et al. .................. 385/92 |

* cited by examiner

*Primary Examiner*—Frank G. Font
*Assistant Examiner*—Ryan Lepisto

(57) ABSTRACT

An optoelectronic module is seated onto a substrate connector by guiding the module along an initial path portion that is misaligned with respect to the mating direction defined by the substrate connector and further includes providing a positive pressure drive along an end path portion with sufficient force to secure the optoelectronic module to the substrate connector. Where the mating is via a pin-and-socket arrangement, the positive pressure drive requires sufficient force to push the main body of the module to ensure entry of the pins into the sockets. Typically, there is a conversion from force applied in one direction to module motion in the orthogonal direction. However, a rocking cam embodiment is also described.

10 Claims, 8 Drawing Sheets

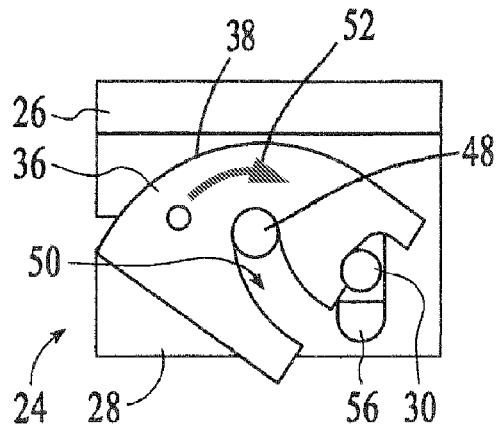
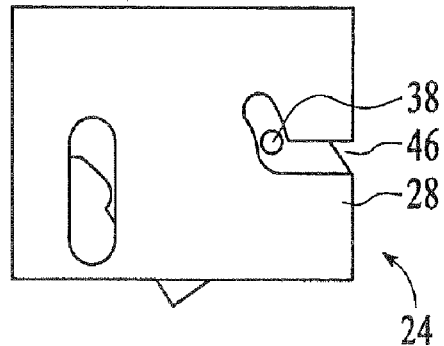
FIG.6  FIG.7
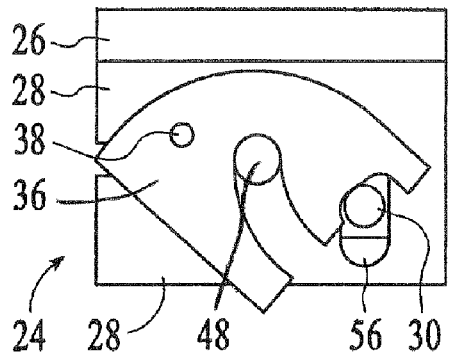
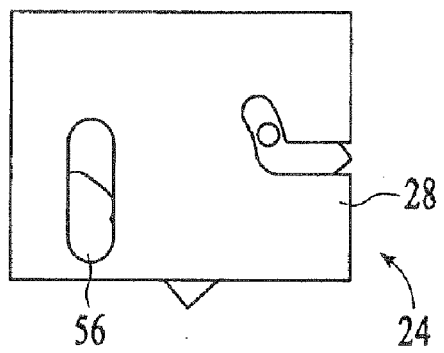
FIG.8  FIG.9
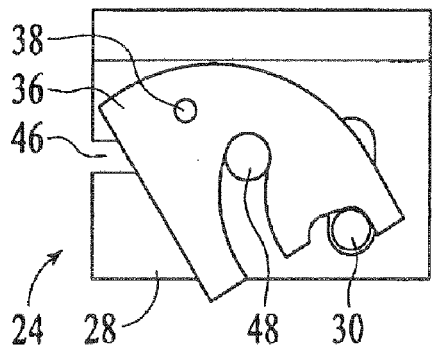
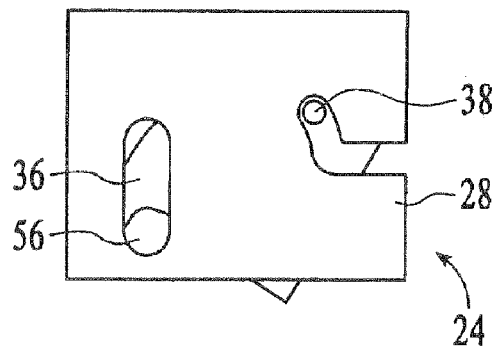
FIG.10  FIG.11

AXIS TRANSLATION INSTALLATION MECHANISM FOR OPTOELECTRONIC MODULES

BACKGROUND ART

Optoelectronic modules include circuitry for converting between signal processing/transmission in an optical mode and signal processing/transmission in an electrical mode. The conversion may be in a single direction, but many modules provide bidirectional conversions to enable data exchanges in both modes. Optoelectronic modules are used in telecommunications central offices and in centralized computing facilities, where there is a significant demand for high bandwidth communications. As compared to metal interconnects, such as copper wiring, optical interconnects offer benefits with regard to both bandwidth and performance (e.g., less skew), while satisfying requirements relating to eye safety, electromagnetic compatibility, reliability, manufacturability, and cost.

It is common to couple an array of optoelectronic modules to a single substrate, such as a printed circuit board. Connectivity of a particular module is provided by coupling a module connector to a substrate connector. Edge-card style connectors are often used, but parallel optical links typically require the use of high-density electrical connectors to accommodate the larger number of electrical signals that must be managed. A single optical link may combine twelve optical channels that are separated into twelve electrical signals within the module. It follows that for each such link, there is a need for twelve electrical paths between the module and the substrate. Thus, the edge-card style connectors are sometimes replaced by connectors having pin-and-socket arrangements. The pins are rigid wire strands of electrically conductive material that are received within sockets having a fixed arrangement that corresponds to that of the pins.

A greater degree of flexibility with regard to the maintenance of the telecommunications central office or the centralized computing facility is available if the optoelectronic modules are replaceable. A difficulty is that the openings for inserting and removing optoelectronic modules through the housing of the host system typically allow the greatest degree of freedom for module movement in the Z axis, i.e., the axis that is parallel to the surface of the substrate on which the substrate connectors are mounted. This is shown in FIGS. 1 and 2. A printed circuit board 10 having an electrical connector 12 is shown as being within the interior of a housing that includes a bezel, or faceplate 14. The optoelectronic module 16 enters the housing through an opening within the faceplate, as indicated by the arrow 18 along the Z axis. However, the seating of the module must occur along the Y axis, which is represented by arrowed line 20. The module connector 22 must properly seat onto the substrate connector 12, but the direction of movement for seating the module is orthogonal to the greatest degree of freedom of module movement. Either before or after the module connector is seated, an optical fiber 29 is joined to the optoelectronic module to input/output optical signals.

One solution is to mount a substrate connector that has a seating direction perpendicular to the printed circuit board 10 (i.e., along the Z axis). The module connector 22 must be relocated to the rear surface of the optoelectronic module 16, rather than the bottom surface as shown in FIGS. 1 and 2. This allows the user to merely push the module rearwardly until the two connectors are seated together. This solution has benefits, but may impose restrictions on signal density.

An alternative solution is described in U.S. Pat. No. 6,074,228 to Berg et al. Pressure contacts are preferably used for the connectors of Berg et al., rather than insertion contacts which require significantly more force in order to provide proper seating. The pressure contacts may be J-shaped leads which deflect slightly when press fit to contact pads of another connector. Since the required mating forces are reduced, the insertion force requirements are relaxed. The substrate connector of Berg et al. has a body that includes a guide member which is elongated along the Z axis. The elongated body of the substrate connector is surface mountable on a printed circuit board. The connector body also includes a camming element that is comprised of ramped regions. When the replaceable module is slid along the elongated body of the connector, a cam follower of the module raises and lowers the end of the module because of contact with the ramped regions of the camming element. While the raising and lowering of the module brings the module connector into contact with the leads of the substrate connector, the pressure contact may not be sufficient for some applications. Specifically, there may be concerns that less than all of the leads of the substrate connector have a low resistance connection to the contact pads of the module connector.

SUMMARY OF THE INVENTION

The seating of an optoelectronic module onto a substrate connector includes guiding the module along an initial path portion that is misaligned from the mating direction of the substrate connector and includes providing a positive pressure drive along an end path portion with sufficient force to secure the optoelectronic module to the substrate connector. For applications in which the substrate and module connectors are electrical connectors that are coupled using a pin-and-socket arrangement, the positive pressure drive is enabled to push the main body of the optoelectronic module with sufficient force to ensure entry of the pins into the sockets.

In a system for controlling the coupling of module connectors of a number of optoelectronic modules to an array of substrate connectors on a substrate, such as a printed circuit board, each optoelectronic module is associated with a device having a slide configured to receive the optoelectronic module so as to enable sliding movement of the module and includes a drive mechanism coupled to the slide to displace the slide toward and away from the substrate. In the sliding movement of the module, the module remains non-coplanar with the substrate connector to which it is to be coupled. However, the drive mechanism then displaces the slide toward and away from the substrate, with the displacement being such that the module connector is aligned to couple with the substrate connector.

The method of controlling coupling of a module connector to a substrate connector may be described as including the step of sliding the optoelectronic module along a plane that is parallel to the substrate surface on which the substrate module is fixed. During this sliding movement, the module connector remains at a distance from the substrate surface such that the two connectors remain in a non-coplanar relationship. The method includes mechanically applying a coupling force to push the optoelectronic module toward the substrate in a controlled alignment to securely couple the module and substrate connectors. In a decoupling operation in accordance with the method, a decoupling force that is the reverse of the coupling force is mechanically applied to unseat the module connector from the substrate connector.

The optoelectronic module is then slid along the same plane followed during the initial insertion, but in the reverse direction.

As one possibility, the seating device includes a slide that remains stationary as the optoelectronic module is slid into place. The slide has a slide surface which defines the initial path portion for movement of the module. After the sliding action has been completed, a cam is pivoted to press the slide surface toward the substrate. A cam handle remains exposed to provide access by a user. When the cam handle is rotated in one direction, the connector of the optoelectronic module is seated to the substrate module. Rotation of the cam handle in the opposite direction unseats the connectors.

In another embodiment, the seating device includes a sliding cam. The device has a slide that is perpendicular to the mating direction of the connectors. The positive pressure drive of the device includes an actuator and slots that are aligned with the mating direction. In this embodiment, movement of an actuator in the mating direction controls movement of the slide. For applications in which the substrate is mounted horizontally, the slide structure is moved horizontally to a position that aligns the substrate and module connectors and then is moved vertically to bring the two connectors into contact.

In a rocking slide cam embodiment, the angle of the optoelectronic module varies with approach toward a seated condition of the connectors. For example, a number of actuator pins may be received within a corresponding number of grooves configured to determine the variation in module angle. In this embodiment, an actuator and the optoelectronic module may be in a fixed relationship with travel of the module along the initial path portion. However, the actuator is moved relative to the optoelectronic module during the end path portion, when the force is applied for seating the module connector with the substrate connector.

The seating device also has a mechanical toggle switch embodiment. In this embodiment, linkage may be used to translate motion of an actuator along an axis that is perpendicular to the mating direction into motion of the optoelectronic module in the mating direction.

The positive pressure drive may also be provided by a stroke multiplier mechanism in which motion of an actuator in a direction perpendicular to the mating direction is translated to motion in the mating direction by orientations of at least two slots. For example, a first slot in a fixed rail may have an orientation opposing a second slot in a movable slide. Additionally, vertical slots in the rail may be used to constrain the motion of the slide vertically, so that force applied to the actuator is desirably coupled to the slide.

BRIEF DESCRIPTION OF THE DRAWINGS

FIGS. 4, 6, 8 and 10 are front view of different steps in the operation of the force latch mechanism of FIG. 3.

FIGS. 5, 7, 9 and 11 are rear views of the different steps for operating the force latch mechanism of FIG. 3.

DETAILED DESCRIPTION

Figure 1:
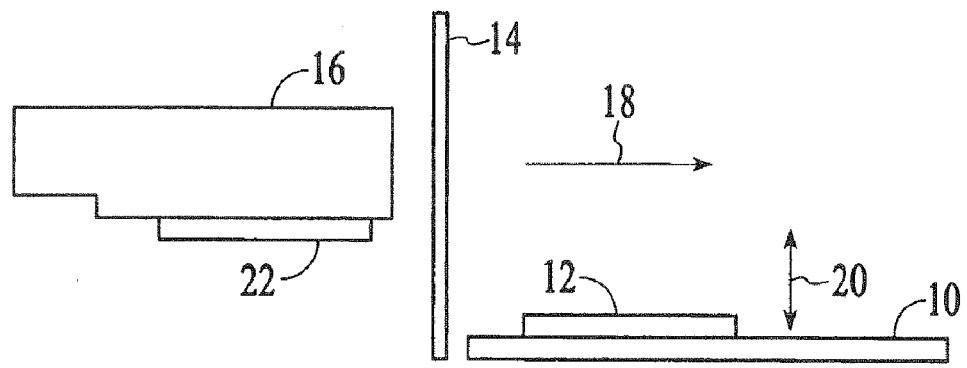
FIG. 1 is a side view of an optoelectronic module to be seated within the interior of a host system.
Figure 2:
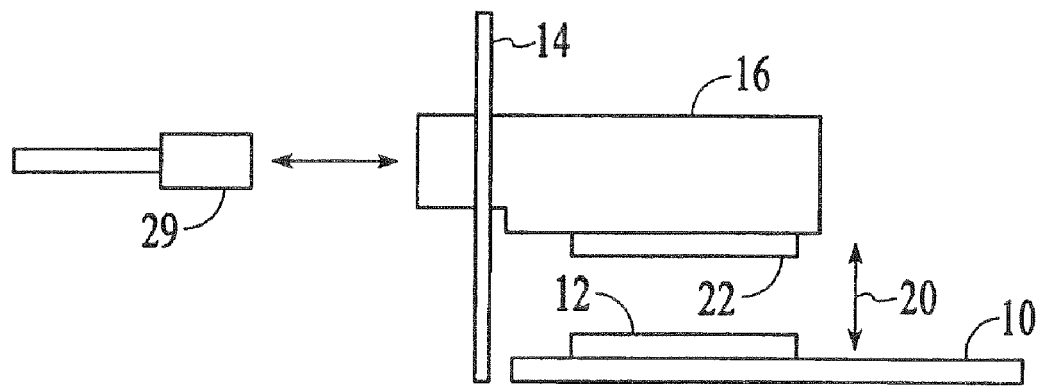
FIG. 2 is a side view of the optoelectronic module positioned above the connector to which the module is to be seated.

The invention is a means for seating an optoelectronic module, such as the module 16 shown in FIGS. 1 and 2, to a connector 12 on a substrate 10, such as a printed circuit board. A user is able to insert and withdraw the module through an opening in the faceplate 14 without withdrawing the substrate from the host system. In the embodiments to be described below, the module moves in the Z axis direction 18 before force is applied in the Y axis direction 20, but the directions are not necessarily horizontal and vertical. While the seated connectors 12 and 22 will be described as being electrical connectors, in some applications the invention may be used to properly seat optical connectors. In such applications, the optical fiber 29 is replaced with electrical input/output members, since the module 16 is one in which conversions between an optical mode and an electrical mode are performed. As will be recognized by a person skilled in the art, the ability to connect and disconnect the fiber 29 may be replaced with a "pigtailed" module in which the fiber is fixed with respect to the module.

Figure 3:
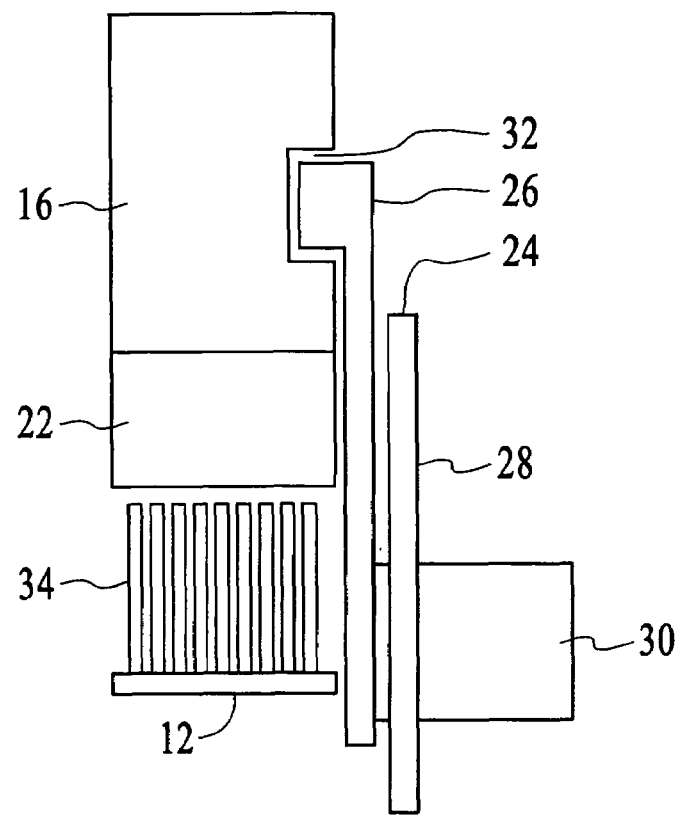
FIG. 3 is a Z axis view of a force latch mechanism as one embodiment for seating an optoelectronic module in accordance with the invention.

A first embodiment of the seating device is shown in FIG. 3. This embodiment takes the form of a force latch mechanism 24 that is able to simultaneously apply force in two perpendicular directions so as to install or remove the optoelectronic module 16. The mechanism includes a slide member 26, a rail 28, and a slide pin 30. A recess 32 within the module 16 is aligned to receive the slide 26. While not shown in FIG. 3, the module rests on the upper surface of the slide 26.

The module connector 22 is shown as being positioned above the substrate connector 12. In operation, the module 16 slides along the top surface of the slide 26 with the two connectors remaining misaligned relative to the distance from the substrate on which the connector 12 resides. In the embodiment of FIG. 3, the substrate connector 12 includes an array of pins 34 that project upwardly for reception within a corresponding array of sockets within the module connector 22. Alternatively, the socket-and-pin arrangement may be reversed.

Figures 4, 5:
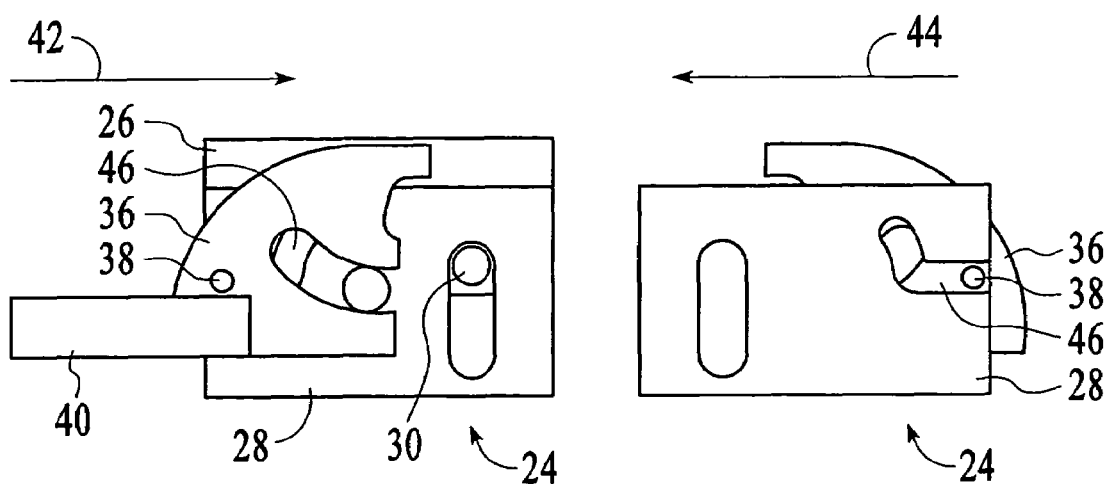

FIGS. 4 and 5 respectively show front and rear views of the force latch mechanism 24, but without a module. For purposes of illustration, the slide 26 has been removed from the mechanism 24 in FIG. 5. A cam 36 is attached to the rail 28 at a sliding cam pin 38. The cam includes a cam handle 40 that is accessible to a user during a seating or unseating operation.

In a seating operation, the module is slid along the surface of the slide 26 to the position shown in FIG. 3. After the module is fully inserted, the user pushes the cam handle 40 in the direction indicated by arrows 42 and 44. The initial movement of the module may be considered to be along the Z axis, but the orientation of movement is not critical to the invention.

The force applied to the cam handle 40 causes the cam pin 38 to slide along the first path portion of a slot 46 within the rail 28. When the cam pin reaches the end of the first path portion, the cam handle 40 may be pivoted upwardly such that the cam pin follows an arcuate second path portion of the slot 46.

The front and rear views of FIGS. 6 and 7, respectively, show the condition of the force latch mechanism 24 when the cam pin 38 has reached the end of the first path portion of the slot 46. Because a fixed rail pin 48 engages a slot 50 within the cam 36, the movement of the cam pin along the first path portion induces some pivoting, as indicated by arrow 52. That is, the combination of the cam pin within the rail slot and the rail pin within the cam slot determines movement of the cam as the user applies pressure to the cam handle 40 of FIG. 4. The cam pin reaches the end of the first path portion simultaneously with the rail pin reaching the end of the cam slot. At this point, the cam contacts the slide pin 30 that is entrapped within a vertical opening 56.

FIGS. 8 and 9 illustrate the next step in the seating operation. Here, the cam is rotated as the user applies pressure to the cam handle (not shown). The cam rotates about the rail pin 48. This forces the slide pin 30 to move downwardly within the vertical opening 56, thereby displacing the slide 26 downwardly. Since the module is mounted to the slide, the module also moves downwardly.

In FIGS. 10 and 11, the cam handle has been fully rotated. Consequently, the slide and module have been forced downwardly to achieve mating with the substrate connector 12 of FIG. 3. Sufficient force is provided to ensure that the pin-and-socket arrangement of the two connectors 12 and 22 provides low resistance coupling of the pins 34 with the optoelectronic module 16.

The steps for removing the optoelectronic module 16 of FIG. 3 are the reverse of those described with reference to FIGS. 4-11. The cam handle 40 is rotated in a counterclockwise direction and is pulled rearwardly to the position shown in FIG. 4. This allows the module to be easily removed from the slide 26. While the manipulation of the cam handle has been described as being manual, the force latch mechanism 24 may be adapted to hydraulic, pneumatic or electromechanical systems.

Figure 12:
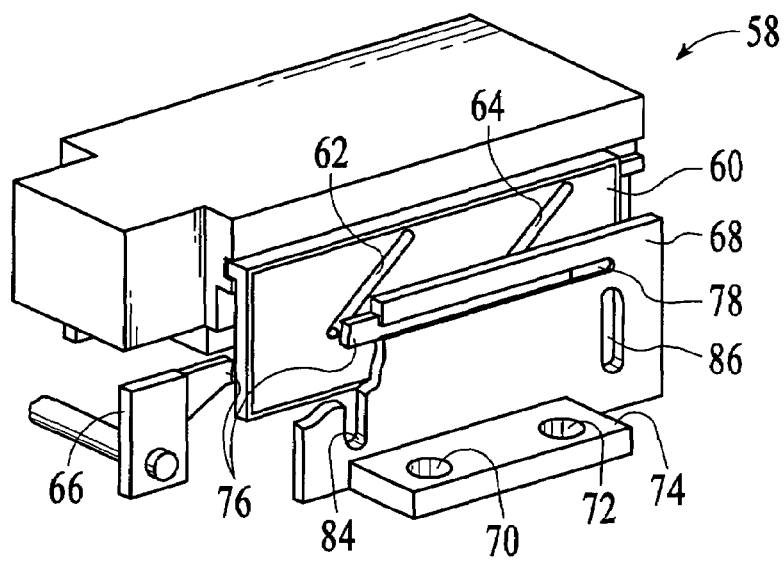
FIG. 12 is a perspective view of a sliding cam mechanism in accordance with a second embodiment of the invention.

FIG. 12 illustrates a second embodiment of the invention. In this embodiment, the seating device is a sliding cam mechanism 58. The mechanism couples perpendicular motion by use of a slide 60 having diagonal slots 62 and 64. A rail system is composed of the slide 60, an actuator 66, and a rail 68. In this embodiment, the optoelectronic module 16 travels in the Z axis and engages the slide by means of a groove. The slide may be considered to be a sliding cam. The rail may be connected to the substrate by screws or other fasteners which pass through a pair of openings 70 and 72 within a bracket 74.

Figure 13:
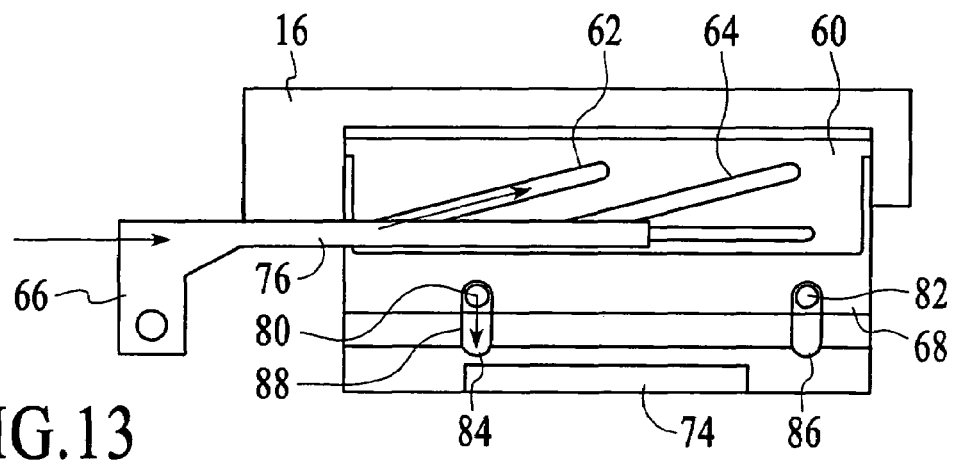
FIG. 13 is a side view of the sliding cam mechanism of FIG. 12 with an optoelectronic module in a raised position.
Figure 14:
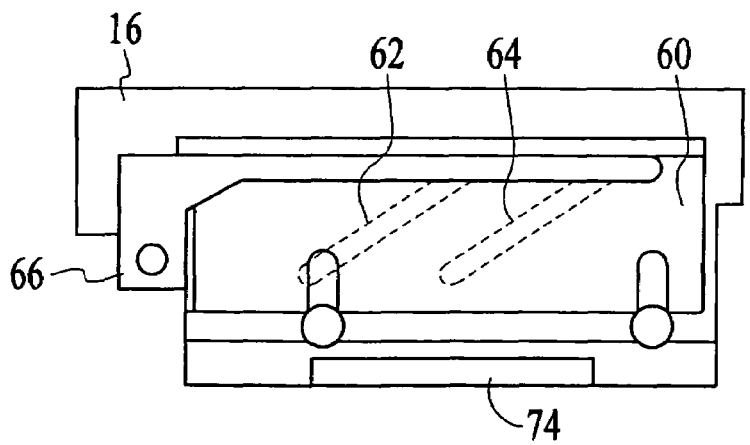
FIG. 14 is a side view of the sliding cam mechanism of FIG. 12 with the module in its seated position.

FIG. 13 shows the optoelectronic module 16 in a raised position, while FIG. 14 shows the module in a fully seated position. Once the module is inserted, the actuator 66 accomplishes the Y axis (vertical) motion of the module by coupling the paths of various slots with the module. As best seen in FIG. 13, the actuator extends to a sliding member 76 that lies within a rail slot 78 of the rail 68. The sliding member 76 has projections which extend into the diagonal slots 62 and 64 on the slide 60. Since the slots extend diagonally upward, horizontal motion of the sliding member 76 and its projections is translated into vertical motion of the slide 60 and the module that is coupled to the slide. A pair of pins 80 and 82 extending from the slide project into vertical slots 84 and 86 within the rail 68. As represented by arrow 88, motion of the slide 60 is confined to the vertical by the use of the pins 80 and 82 within the vertical slots 84 and 86. The vertical slide-rail constraint can be achieved in other manners, such as by the use of dovetail joints or folded edges that capture the slide.

The operational steps of a third embodiment are illustrated in FIGS. 15-19. Here, the seating device is a rocking slide cam mechanism 98. In this embodiment, the number of components is reduced, but the complexity of individual components is increased. A rail 90 receives the optoelectronic module 16. The slots 92 and 94 within the rail are configured to cause the module to rock as pressure is applied to an actuator 96. That is, rocking motion occurs as opposed to the straight vertical descent of the embodiment of FIGS. 12-14. The illustrated embodiment operates well with the MEG array connector known in the art.

Figure 15:
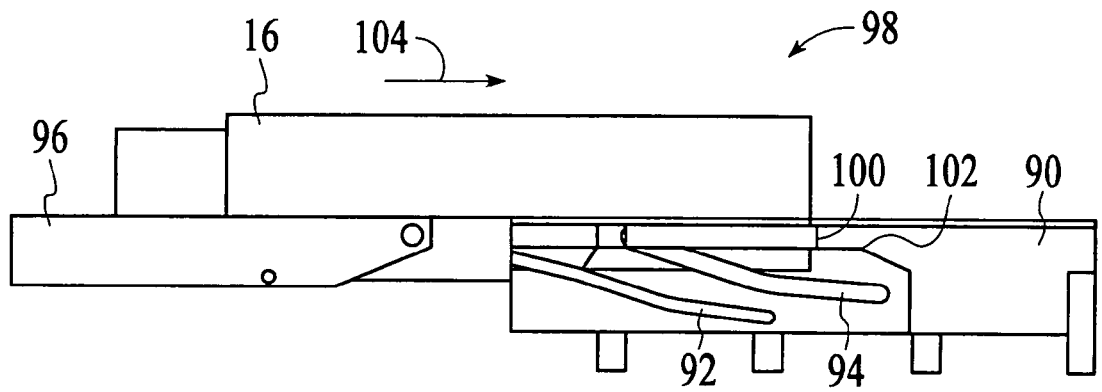
FIG. 15 is a rocking slide cam mechanism in accordance with a third embodiment of the invention.

In FIG. 15, the optoelectronic module is inserted into the rocking slide cam mechanism 98. A user can apply pressure directly to the module or to the actuator 96. A rigid protrusion 100 extends beyond the module and initially rides within a slot groove 102.

Figure 16:
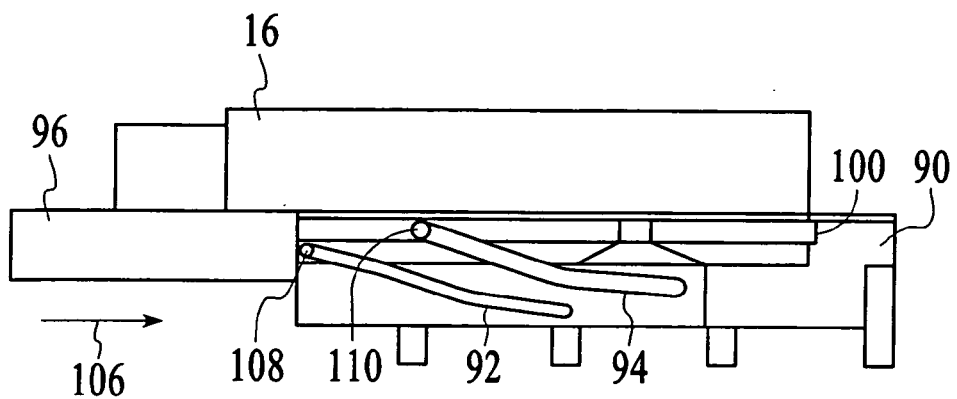
FIGS. 16-19 illustrate different steps in the operation of the rocking sliding cam mechanism of FIG. 15.

The arrow 104 in FIG. 15 represents the movement of the module 16 relative to the actuator 96 and the rail system 90. After the module has been properly seated, the actuator is pressed inwardly, as represented by arrow 106 in FIG. 16. Within each slot 92 and 94 resides an actuator pin 108 and 110. Immediately prior to the application of force to the actuator 96, the actuator pins are at the ends of the slots, as shown in FIG. 16. As the module is pushed rearwardly, the two actuator pins 108 and 110 follow their respective grooves, but the grooves have different geometries such that the pins follow different paths.

Figure 17:
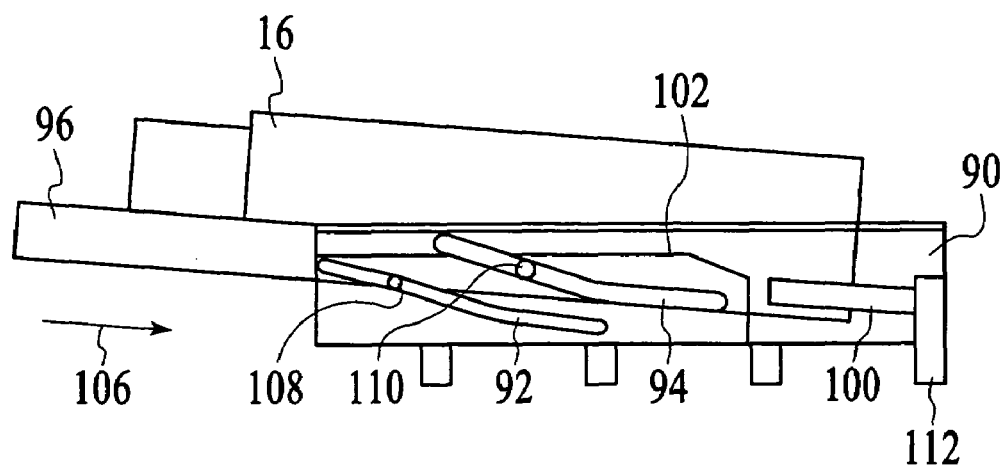
Figure 18:
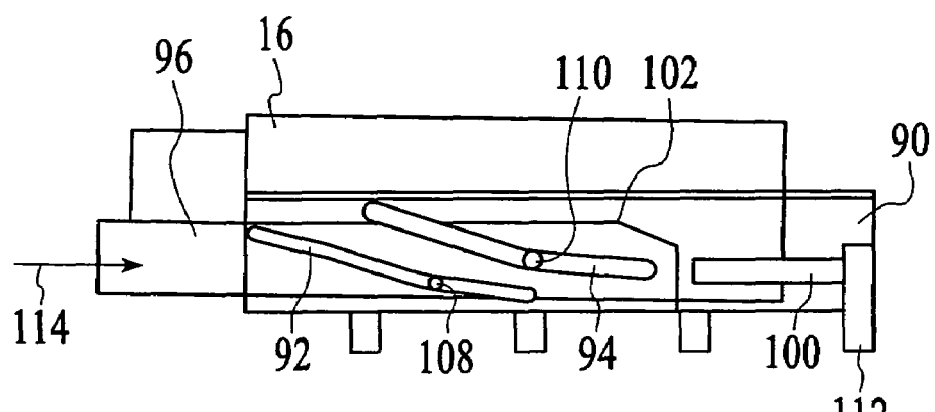

Referring now to FIG. 17, when the protrusion 100 at the end of the module 16 clears the slot groove 102, the rear of the module is no longer supported by the rail system 90. However, the two actuator pins 108 and 110 control the position of the module by means of their engagement with the respective slots 92 and 94. The slots in the rail system are designed such that the module exhibits a slight tilt, which is intended to accommodate the high mating force required for high density electrical connectors.

Figure 19:
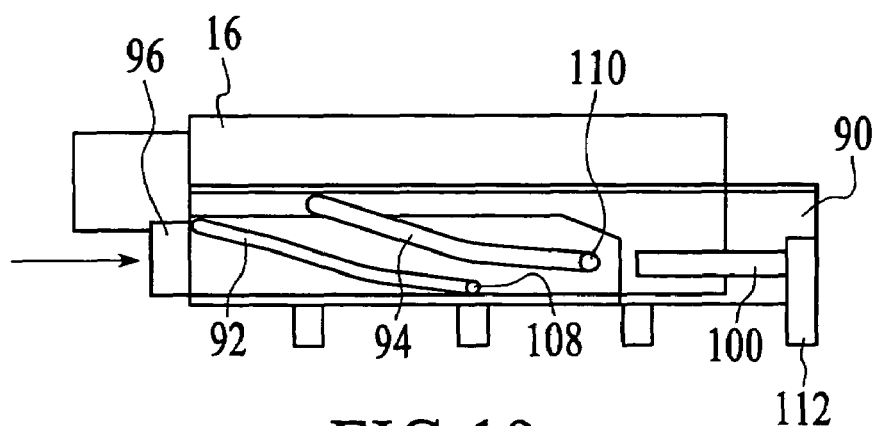

The rearward movement of the module 16 causes the protrusion 100 to abut a hard stop 112. The contact of the protrusion with the hard stop prevents any further movement of the module along the Z axis (arrow 106). In this embodiment, the actuator is able to release from its neutral position, so as to be movable relative to the module. As the user continues to push the actuator 96, the actuator moves relative to the module, as represented by arrow 114 in FIG. 18. Movement of the module tracks the geometries of the slots 92 and 94. The module is forced downwardly to mate with the electrical connector (not shown). In FIG. 19, the actuator 96 has reached its final position. In this position, the module 16 is locked into its seated position with no tilting. An unseating operation follows the reverse of the seating operation.

The geometry of the slots 92 and 94 can be designed to accommodate any type of connector. Thus, the principle may be modified for any particular application.

Figure 20:
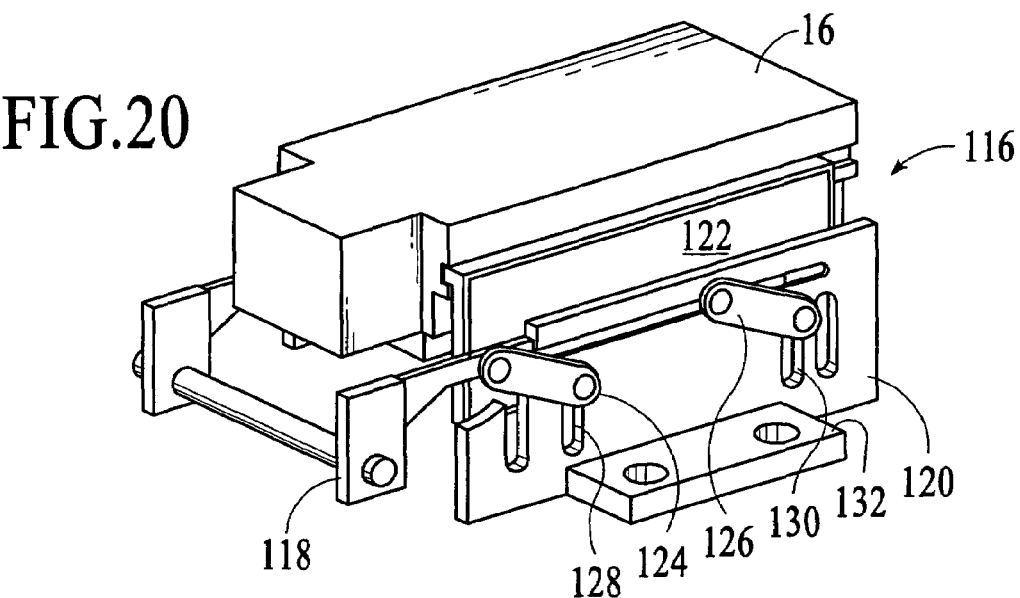
FIG. 20 is a toggle switch mechanism in accordance with a fourth embodiment of the invention.

FIG. 20 illustrates a toggle switch mechanism 116 in accordance with another embodiment of the invention. The mechanism includes an actuator 118, a rail 120, and a slide 122. The cooperation of components converts the Z axis motion of the actuator 118 into Y axis translation of the module 16 by means of links 124 and 126. Each link has a first end that is pivotally connected to the actuator, such that the first ends move linearly with the actuator, but are able to rotate. The opposite end of each link is coupled to a vertical slot 128 and 130 within the rail. A bracket 132 may be used to mount the mechanism to a substrate, such as a printed circuit board.

Figure 21:
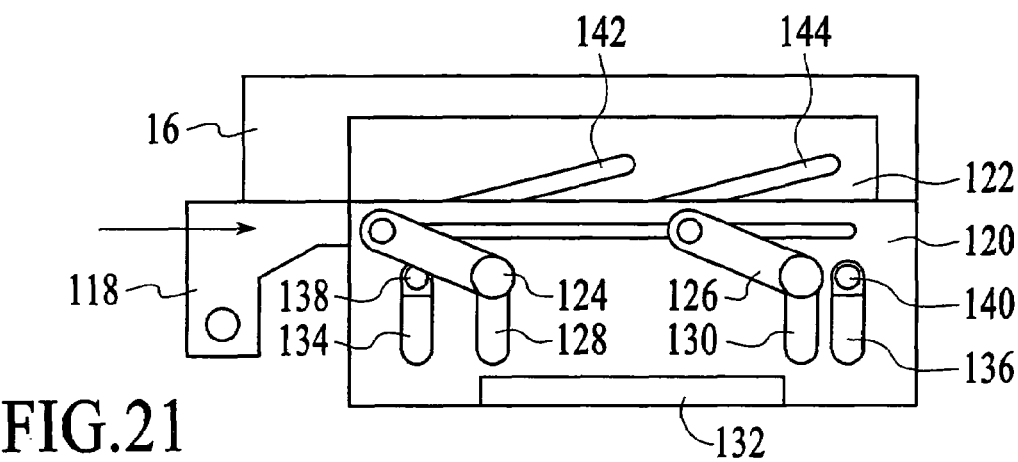
FIGS. 21 and 22 are side views of steps for operating the toggle switch mechanism of FIG. 20.

As best seen in FIG. 21, the rail 120 includes a second pair of vertical slots 134 and 136. Engaging each slot is a projection 138 and 140 that is fixed to the slide 122 that supports the module 16. The engagement of the projections with the vertical slots limits the movement of the slide 122 to vertical movement. The mechanism is shown in the raised position in FIG. 21. In this position, the projections 138 and 140 are at the upper extents of the slots 134 and 136. Also, the links 124 and 126 are at only a slight decline.

Figure 22:
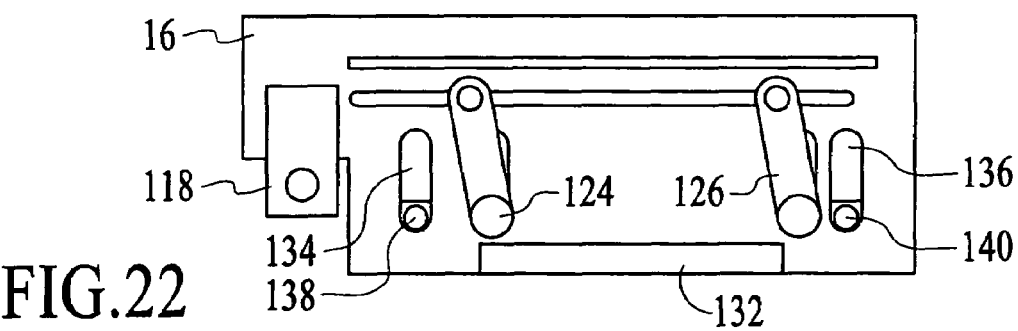

The slide 122 has a pair of diagonal grooves 142 and 144. The movement of the actuator 118 is coupled to the slide 122 by means of the grooves. For example, the pivoting ends of the links 124 and 126 may be secured by pivot pins having ends that extend into the diagonal grooves. Thus, as the actuator is pushed inwardly, the links will pivot at their upper ends and will ride along the respective slots 128 and 130 at the their lower ends. Simultaneously, the pivot pins through the upper ends of the links will travel along the diagonal grooves 142 and 144 to apply downward pressure on the slide 122. This causes the projections 138 and 140 from the slide to travel downwardly along the second pair of vertical slots 134 and 136 within the rail 120. Eventually, the mechanism will reach its lowered position shown in FIG. 22, with the connector of the module 16 properly seated to the substrate connector (not shown).

Figure 23:
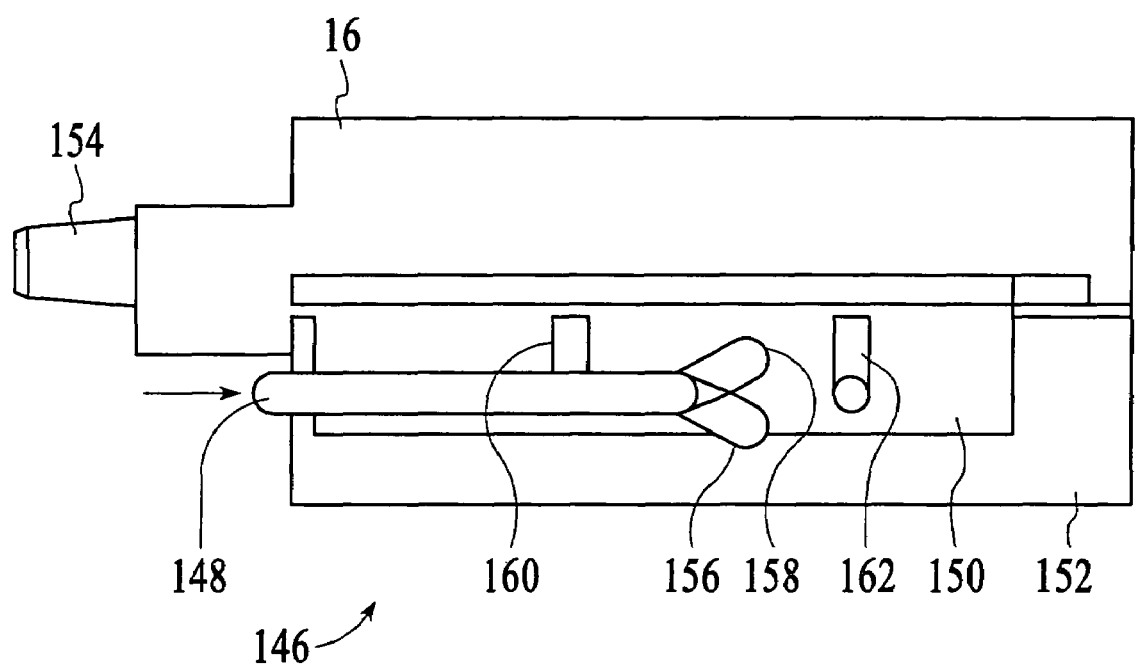
FIG. 23 is a side view of a stroke multiplier mechanism in accordance with a sixth embodiment of the invention.

Yet another embodiment is shown in FIG. 23. The stroke multiplier mechanism 146 includes an actuator 148, a slide 150, and a rail 152. The optoelectronic module 16 is shown as resting in position on the slide. In this figure, the coupler 154 for receiving an input/output optical fiber is included. A pair of opposing diagonal slots 156 and 158 multiply the motion of the input actuator 148. The first of the diagonal slots 156 is in the fixed rail 152, while the second slot 158 is in the movable slide 150. Vertical slots 160 and 162 constrain the motion of the slide vertically. The vertical slots may be either in the rail or the slide. After the module has been engaged to the slide, it is also restricted to vertical movement.

By modifying the angle of the opposing diagonal slots 156 and 158, it is possible to adjust the stroke multiplication to the degree required for a particular connector. The sliding cam mechanism 58 of FIG. 12 may be considered to be a specific embodiment of a stroke multiplier, if one of the "opposing slots" is identified as the horizontal rail slot 78.

While a number of mechanisms have been described and illustrated for converting the direction of motion orthogonally so as to seat an optoelectronic module, the invention extends beyond the illustrated embodiments. Moreover, the conversion need not be directly orthogonal, as can be seen by the rocking slide cam mechanism of FIGS. 15-19, which takes advantage of module tilting to provide the force necessary to properly mate the module connector to the substrate connector.

What is claimed is:

1. A device for seating an optoelectronic module onto a connector on a substrate comprising:
   guide structure configured to direct a main body of said optoelectronic module along an insertion direction that is generally perpendicular to a mating direction of said connector, said guide structure comprising a slide having a slide surface along said insertion direction said slide further comprising a slide pin; and
   a positive pressure drive enabled to push said main body of said optoelectronic module along said mating direction with sufficient force to secure said optoelectronic module to said connector, said positive drive comprising:
      a rail comprising a rail pin, said rail defining a first rail slot along said mating direction for receiving said slide pin, said rail further defining a second rail slot having a first portion along said insertion direction and a second portion along an arcuate direction:
      a pivoting cam comprising a cam pin received in said second rail slot, said pivoting cam defining a cam slot along another arcuate direction for receiving said rail pin:
      wherein said cam pin travels to the end of said first portion of said second rail slot to cause said rail pin to travel to the end of said cam slot and said pivoting cam to pivot about said rail pin, and said cam pin travels to the end of said second portion of said second rail slot to cause said pivoting cam to further pivot about said rail pin and push said slide pin in said mating direction, thereby seating said optoelectronic module onto said connector.

2. The device of claim 1 wherein said connector couples with said optoelectronic module in a pin-and-socket arrangement, said positive pressure drive configured to press said main body of said optoelectronic module in said mating direction with a mating force to secure said pin-and-socket arrangement.

3. The device of claim 1 wherein said guide structure and positive pressure drive are mechanically attached to said main body as a single unit.

4. The device of claim 1 wherein said pivoting cam includes a cam handle that remains exposed to ensure access to said cam handle by a user.

5. The device of claim 4 wherein rotation of said cam handle in one direction seats said optoelectronic module and rotation of said cam handle in an opposite direction unseats said optoelectronic module.

6. A method of controlling coupling of a module connector of an optoelectronic module to a substrate connector such that connector pins reside within connector sockets, said optoelectronic module having circuitry for converting between optical and electrical signals, said method comprising:
   sliding said optoelectronic module on a slide along an insertion direction that is generally parallel to a substrate surface to which said substrate module is fixed and perpendicular to a mating direction of said connector pins, including maintaining said module connector at a distance from said substrate surface such that said module connector and said substrate connector remain in a non-coplanar relationship during said sliding along said plane;
   applying a coupling force to push said optoelectronic module toward said substrate in a controlled alignment to securely couple said module and substrate connectors with said connector pins seated within said connector sockets, applying a coupling force comprising pushing a pivoting cam so:
      a cam pin of said pivoting cam travels to the end of a first portion of a first rail slot defined by a rail, thereby causing a rail pin of said rail to travel to the end of an arcuate cam slot of said pivoting cam and pivoting said pivoting cam:

said cam pin further travels to the end of an arcuate second portion of said first rail slot, thereby causing said pivoting cam to further pivot about said rail pin and to push a slide pin of said slide in a second rail slot defined by said rail along said mounting direction, thereby seating said optoelectronic module onto said connector;

decoupling said module and substrate connectors by applying a decoupling force that is a reverse of said coupling force; and removing said optoelectronic module by sliding said optoelectronic module along said plane.

7. The method of claim 6 wherein said slide moves with said optoelectronic module upon applications of said coupling and decoupling forces.

8. The method of claim 7 wherein said slide remains stationary during said sliding of said optoelectronic module.

9. The method of claim 7 wherein applying said coupling force includes mechanically translating force along said insertion direction into force perpendicular to said insertion direction.

10. A device for seating an optoelectronic module along a mating direction onto a connector on a substrate comprising:

a slide that the optoelectronic module slidably engages along an insertion direction substantially perpendicular to the mating direction, the slide comprising a sliding pin;

a rail comprising a rail pin, the rail defining a first rail slot along the mating direction for receiving the sliding pin of the slide, and the rail further defining a second rail slot comprising a first portion along the insertion direction and a second portion along an arcuate direction;

a pivoting cam comprising a cam pin inserted in the second rail slot, the cam defining a cam slot along another arcuate direction for receiving the rail pin;

wherein the cam pin travels to the end of the first portion of the second rail slot to cause the rail pin to travel to the end of the cam slot and the pivoting pin to pivot about the rail pin, and the cam pin travels to the end of the second portion of the second rail slot to cause the pivoting cam to further pivot about the rail pin and push the slide pin in the mating direction, thereby seating the optoelectronic module to the connector.

* * * * *

UNITED STATES PATENT AND TRADEMARK OFFICE
CERTIFICATE OF CORRECTION

PATENT NO. : 7,255,495 B2  Page 1 of 1
APPLICATION NO. : 10/989013
DATED : August 14, 2007
INVENTOR(S) : Robert Yi It is certified that error appears in the above-identified patent and that said Letters Patent is hereby corrected as shown below:

Col. 8 Line 1 In Claim 1, after "direction" insert -- , --.

Col. 8 Line 12 In Claim 1, delete "direction:" and insert -- direction; --, therefor.

Col. 8 Line 16 In Claim 1, delete "pin:" and insert -- pin; --, therefor.

Col. 8 Line 67 In Claim 6, delete "cam:" and insert -- cam; --, therefor.

Signed and Sealed this

Sixteenth Day of December, 2008

JON W. DUDAS
*Director of the United States Patent and Trademark Office*